United States Patent [19]
Oliva

[11] Patent Number: 5,612,685
[45] Date of Patent: Mar. 18, 1997

[54] COMBINED MOTION DETECTOR/TRANSMITTER FOR A TRAFFIC INFORMATION WARNING SYSTEM

[75] Inventor: David C. Oliva, Chicago, Ill.

[73] Assignee: Cobra Electronics Corp., Chicago, Ill.

[21] Appl. No.: 618,855

[22] Filed: Mar. 20, 1996

[51] Int. Cl.$^6$ .................................................. H01Q 1/10
[52] U.S. Cl. ...................... 340/901; 340/905; 340/904; 340/541
[58] Field of Search ................................. 340/901, 902, 340/905, 435, 455, 463, 541, 904; 455/34.1, 34.2, 59

[56] References Cited

U.S. PATENT DOCUMENTS

| | | | |
|---|---|---|---|
| 3,673,560 | 6/1972 | Barsh et al. | 340/33 |
| 3,772,641 | 11/1973 | Grosser et al. | 340/33 |
| 3,784,970 | 1/1974 | Simpkin | 340/33 |
| 4,196,412 | 4/1980 | Sluis et al. | 340/32 |
| 4,216,545 | 8/1980 | Flickshu et al. | 455/77 |
| 4,358,756 | 11/1982 | Morel et al. | 340/539 |
| 4,443,790 | 4/1984 | Bishop | 340/539 |
| 4,454,510 | 6/1984 | Crow | 345/5 |
| 4,529,972 | 7/1985 | Paterson et al. | 340/554 |
| 4,547,778 | 10/1985 | Hinkle et al. | 343/456 |
| 4,794,394 | 12/1988 | Halstead | 340/902 |
| 4,947,151 | 8/1990 | Rosenberger | 340/426 |
| 5,091,906 | 2/1992 | Reed et al. | 370/94.1 |
| 5,210,521 | 5/1993 | Hojell et al. | 340/436 |
| 5,235,329 | 8/1993 | Jackson | 340/902 |
| 5,307,060 | 4/1994 | Prevulsky et al. | 340/436 |
| 5,493,269 | 2/1996 | Durley et al. | 340/433 |
| 5,497,148 | 3/1996 | Oliva | 340/905 |

Primary Examiner—Jeffery Hofsass
Assistant Examiner—Mark S. Rushing
Attorney, Agent, or Firm—Wallenstein & Wagner, Ltd.

[57] ABSTRACT

A combined motion detector/transmitter device for a traffic information warning system is disclosed. The device includes first and second oscillators for transmitting first and second carrier signals, respectively. The first carrier signal has a first carrier signal frequency and the second carrier signal has a second carrier signal frequency. The carrier signals are used to transmit a message regarding a traffic situation based upon either the magnitude of the frequency difference between the first and second carrier signal frequencies or the specific frequency locations of the carrier signals. The first and second oscillators also set up first and second disturbance fields, respectively. A first reflected signal receiver is associated with the first oscillator and receives a first reflected signal when a target is within the first disturbance field. A second reflected signal receiver is associated with the second oscillator and receives a second reflected signal when a target is within the second disturbance field. First and second detector circuits are provided for detecting the presence or absence of a moving target in the first and second disturbance fields, respectively. Finally, the device includes an indicator for indicating the detected presence of a moving target in either the first or second disturbance fields.

16 Claims, 3 Drawing Sheets

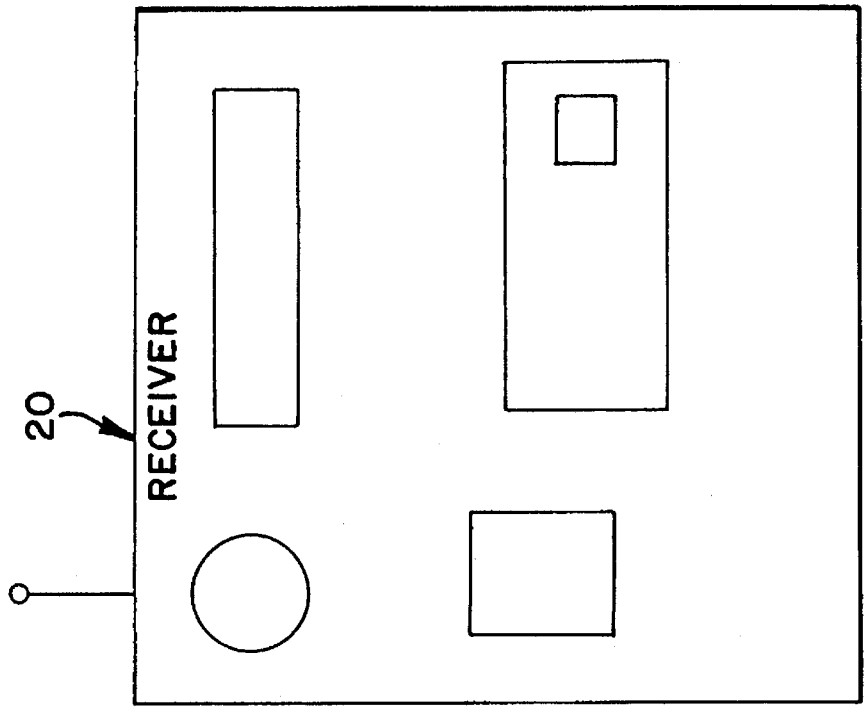
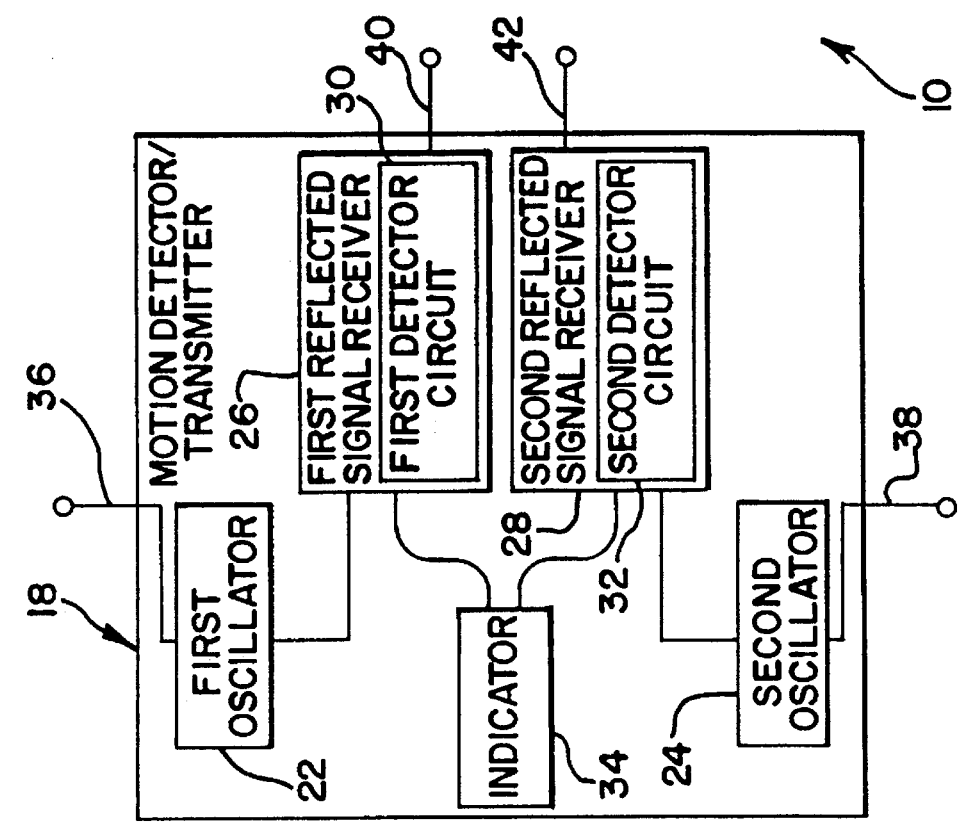

COMBINED MOTION DETECTOR/TRANSMITTER FOR A TRAFFIC INFORMATION WARNING SYSTEM

DESCRIPTION

1. Technical Field

This invention relates to vehicular traffic information systems which warn, or otherwise advise, motorists of various traffic hazards and conditions in their particular operating vicinity. More particularly, the invention is a combined motion detector/transmitter for use in a vehicular traffic information system.

2. Background Prior Art

Various systems have been proposed to inform motorists of traffic hazards. U.S. Pat. No. 5,497,148, assigned to the assignee of the present invention, describes one such system. The system disclosed therein includes a receiver, a transmitter and associated circuitry. Unmodulated carrier signals are transmitted from the transmitter, received by the receiver and interpreted by circuitry so that traffic information is conveyed.

Transmitters are placed in emergency vehicles, near railroad crossings or near traffic hazards, among other places. Police cars, for example, may carry a transmitter.

Dangers associated with being a police officer, however, present a special problem for which the present invention is designed. Specifically, as part of their duties, police officers patrol streets and neighborhoods, and many times detain vehicles. In some situations, vehicles may be detained because their drivers have committed traffic violations, while in other situations because of suspicious behavior on the part of the drivers or other occupants.

It is critical for a police officer's safety to know whether the occupants of the detained vehicle are approaching the police car. In the course of performing their normal duties, police officers cannot always view the detained vehicle or its occupants. For example, after a car has been detained for a traffic violation, an officer often must copy information from the driver's driving license onto a ticket. Clearly, the officer cannot be constantly viewing the detained vehicle or its occupants while performing this task.

Furthermore, because lighting conditions are not always ideal either due to the weather, location or time of the day, their exists the need to provide a means to detect when an individual is approaching a police car. There is also a need to minimize the number of devices and clutter inside the police car. The present invention is designed to meet these needs.

SUMMARY OF THE INVENTION

It is an object of the invention to provide a single device capable of both transmitting traffic information from a traffic advisory site to a vehicle and detecting movement of a target within a plurality of disturbance fields.

In accordance with the invention, the device comprises a combined transmitter and motion detector adapted for placement at the advisory site, such as a police car.

The device includes first and second oscillators for transmitting first and second carrier signals, respectively, and for setting up respective first and second disturbance fields.

The first carrier signal has a first carrier signal frequency and the second carrier signal has a second carrier signal frequency. The carrier signals are used to transmit a message regarding a traffic situation either by the magnitude of the frequency difference between the first and second carrier signal frequencies or the frequency locations of the carrier signals.

A first reflected signal receiver is associated with the first oscillator and receives a first reflected signal when a target is within the first disturbance field. A second reflected signal receiver is associated with the second oscillator and receives a second reflected signal when a target is within the second disturbance field.

First and second detector circuits are provided for detecting the presence or absence of a moving target in the first and second disturbance fields, respectively.

Finally, the device includes an indicator for indicating the detected presence of a moving target in either the first or second disturbance fields.

Other features and advantages of the invention will be apparent from the following specification taken in conjunction with the following drawings.

BRIEF DESCRIPTION OF DRAWINGS

FIG. 2 is a block diagram of a traffic information warning system showing a combined transmitter and motion detector, and a receiver; and, FIG. 3 is a diagrammatic representation showing the operation of the combined motion detector/transmitter.

DETAILED DESCRIPTION

Figure 1:
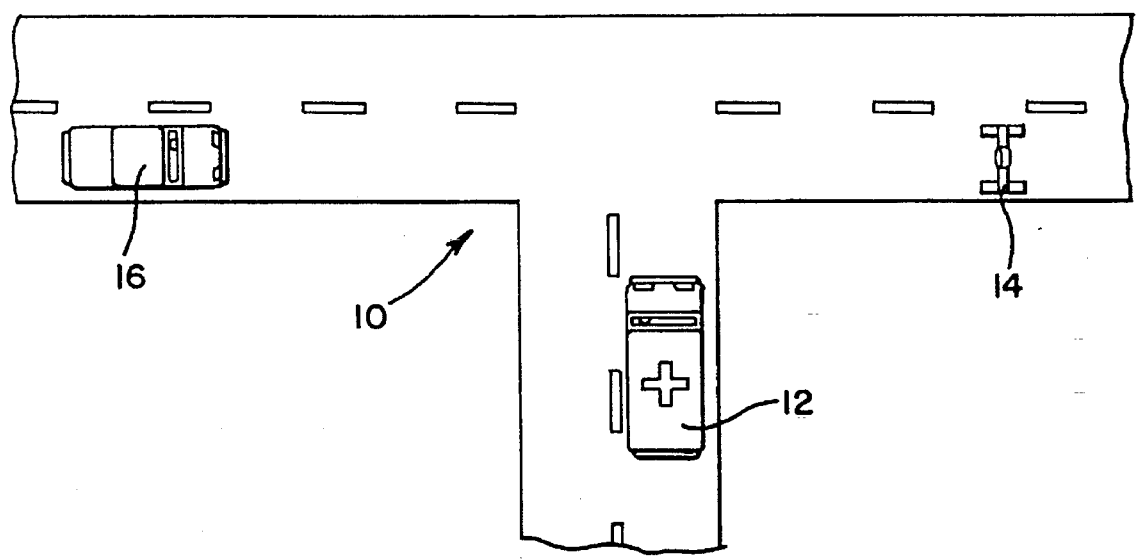
FIG. 1 is a schematic plan view of a traffic situation.

While this invention is susceptible of embodiments in many different forms, there is shown in the drawings and will herein be described in detail, a preferred embodiment of the invention with the understanding that the present disclosure is to be considered as an exemplification of the principles of the invention and is not intended to limit the broad aspects of the invention to the embodiment illustrated.

Traffic information warning systems are used to convey messages regarding traffic situations. Two such traffic information warning systems are described in U.S. Pat. No. 5,497,148 and U.S. application Ser. No. 08/564,468, both of which are assigned to the assignee of the present invention and both of which are incorporated herein by reference.

A traffic information warning system generally designated by reference numeral 10 is used to convey a message regarding a traffic situation from a traffic advisory site, such as an emergency vehicle 12 or a roadside hazard 14, to a vehicle 16 as illustrated in FIG. 1. As shown in FIG. 2, the system 10 comprises a combined motion detector/transmitter 18 adapted for placement at the advisory site, such as inside the emergency vehicle 12 or alongside the roadside hazard 14. The system 10 further comprises a receiver 20 adapted for placement inside the vehicle 16.

As mentioned above, it is critical for a police officer's safety to know whether the occupants of a detained vehicle are approaching his or her police car. In the course of performing his or her normal duties, the police officer cannot always view the detained vehicle or its occupants. For example, after a car has been detained for a traffic violation, an officer often must copy information from the driver's driving license onto a ticket.

Furthermore, because lighting conditions are not always ideal either due to the weather, location or time of the day, there exists the need to provide a means to detect when an individual is approaching a police car. There is also a need to minimize the number of devices and clutter inside the police car. The combined transmitter and motion detector of the present invention is designed to meet these needs and to minimize the dangers a police officer may encounter while detaining a vehicle.

As shown in FIG. 2, the combined motion detector/transmitter 18 includes a first oscillator 22 for transmitting a first carrier signal having a first carrier signal frequency $S_1$ and a second oscillator 24 for transmitting a second carrier signal having a second carrier signal frequency $S_2$.

As described in U.S. Pat. No. 5,497,148, unmodulated carrier signals are used to transmit a message regarding a traffic situation either by the magnitude of the frequency difference between the first and second carrier signal frequencies $S_1$, $S_2$ or the specific frequency locations of the carrier signals.

Figure 3:
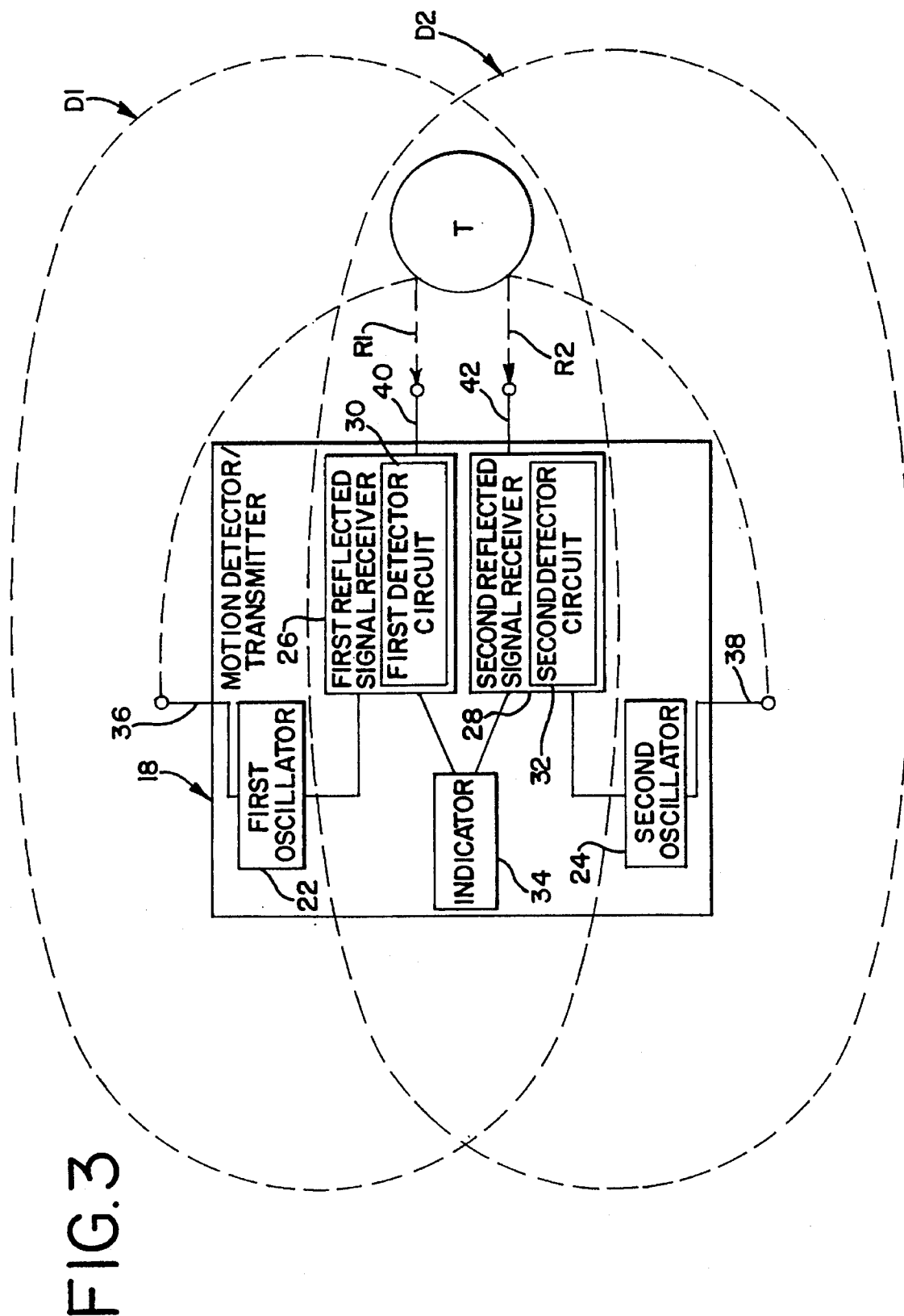

With reference to FIGS. 2 and 3, in addition to transmitting information regarding a traffic situation, the first and second carrier signals are used to set up first and second disturbance fields $D_1$, $D_2$. The combined motion detector/transmitter 18 indicates when a target T is moving through either of the disturbance fields. This is accomplished through use of first and second reflected signal receivers 26, 28 and first and second detector circuits 30, 32.

Specifically, the first oscillator 22 transmits a first carrier signal at a first carrier signal frequency $S_1$ and sets up a first disturbance field $D_1$. When a target T is within the first disturbance field $D_1$, the first carrier signal is reflected by the target as a first reflected signal $R_1$. The first reflected signal receiver 26 picks up the first reflected signal $R_1$ and in conjunction with first detector circuit 30 determines the frequency and phase of the first reflected signal $R_1$.

As is well known in the art, if the target T is stationary, the first reflected signal $R_1$ will have a frequency and phase identical to the first carrier signal. However, if the target T is moving, the frequency of the first reflected signal $R_1$ will vary based upon the velocity of the target T and will vary in phase based upon the direction of movement of the target T.

The first detector circuit 30 is fed the frequency and phase of the first carrier signal. Thus, by comparing the first reflected signal $R_1$ to the first carrier signal, the first detector circuit 30 can determine the speed and direction of the target T.

As an example, when the first carrier frequency is 24.230 GHz (a representative frequency for traffic information warning systems), the frequency of the first reflected signal will vary 72.2 Hertz per mile per hour.

Operation of the second oscillator 24, second reflected signal receiver 28 and second detector circuit 32 is similar to the operation of the first oscillator 22, first reflected signal receiver 26 and first detector circuit 30.

There are at least two advantages of generating a second disturbance field instead of generating a single disturbance field. First, the area covered by the combination of the fields is greater than by a single disturbance field. Second, if one of the detector circuits in not functioning properly, the other detector circuit, assuming it is functioning properly, serves to cover for the nonfunctioning detector in those areas where the disturbance fields overlap.

If the first or second detector circuits 30, 32 determine that the target T is moving within the first or second disturbance fields $D_1$, $D_2$, then the first or second detector circuits 30, 32 transmit a signal to an indicator 34 which indicates the detected presence of a moving target in either of the first or second disturbance fields $D_1$, $D_2$.

It will be understood that the indicator can be either audio or visual, or both. If the indicator is of the audio type, the indicator could be a voice-synthesized message, for example.

As shown in FIGS. 2 and 3, first oscillator antenna 36 and second oscillator antenna 38 respectively cooperate with first and second oscillators 22, 24 to direct first and second carrier signals and to set up first and second disturbance fields $D_1$, $D_2$. First and second oscillator antennas 36, 38 can take on various forms. It is preferred, however, that the first oscillator antenna 36 include a pair of patch antennas placed back-to-back. Similarly, back-to-back patch antennas are preferred for the second oscillator antenna 38. Using a pair of patch antennas placed back-to-back provides a nearly omnidirectional transmission of the carrier signals and hence, omnidirectional disturbance fields due to the well-known transmission characteristics of patch antennas.

First receiver antenna 40, which cooperates with first reflected signal receiver 26, and second receiver antenna 42, which cooperates with second reflected signal receiver 28, are used to receive first and second reflected signals $R_1$, $R_2$, respectively. These antennas may also take on various forms. In the preferred embodiment, however, the first receiver antenna 40 and the second receiver antenna 42 are both patch antennas.

Because the first carrier signal and the second carrier signal are separated on the order of tens of MHz and the expected velocity of targets of interest in the disturbance fields is relatively low, the sensitivity of the detector circuits 30, 32 is set so that the first detector circuit 30 does not confuse the first reflected signal $R_1$ with the second reflected signal $R_2$ and the second detector circuit 32 does not confuse the second reflected signal $R_2$ with the first reflected signal $R_1$.

It will be understood that the invention may be embodied in other specific forms without departing from the spirit or central characteristics thereof. The present embodiment, therefore, is to be considered in all respects as illustrative and not restrictive, and the invention is not to be limited to the details given herein.

We claim:

1. A combined motion detector/transmitter for a traffic information warning system for conveying a message regarding a traffic situation comprising:

a first oscillator for transmitting a first unmodulated carrier signal and for setting up a first disturbance field, the first unmodulated carrier signal having a first carrier signal frequency;

a second oscillator for transmitting a second unmodulated carrier signal and setting up a second disturbance field, the second unmodulated carrier signal having a second carrier signal frequency, wherein the difference in magnitude between the first carrier signal frequency and the second carrier signal frequency specifies the message regarding the traffic situation;

a first reflected signal receiver associated with the first oscillator for receiving a first reflected signal when a target is within the first disturbance field;

a second reflected signal receiver associated with the second oscillator for receiving a second reflected signal when a target is within the second disturbance field;

a first detector circuit for detecting the presence or absence of a moving target in the first disturbance field;

a second detector circuit for detecting the presence or absence of a moving target in the second disturbance field; and, an indicator for indicating the detected presence of a moving target in either the first or second disturbance field.

2. The device of claim 1 wherein the indicator includes an audible sound.

3. The device of claim 2 wherein the audible sound is a voice-synthesized message.

4. The device of claim 1 wherein the indicator includes a visible display.

5. The device of claim 1 wherein a pair of patch antennas are connected to the first oscillator to transmit the first unmodulated carrier signal.

6. The device of claim 1 wherein a pair of patch antennas are connected to the second oscillator to transmit the second unmodulated carrier signal.

7. The device of claim 1 wherein a first receiver antenna is connected to the first reflected signal receiver to receive the first reflected signal when a target is in the first disturbance field, the first receiver antenna being a patch antenna.

8. The device of claim 1 wherein a second receiver antenna is connected to the second reflected signal receiver to receive the second reflected signal when a target is in the second disturbance field, the second receiver antenna being a patch antenna.

9. A combined motion detector/transmitter for a traffic information warning system for conveying a message regarding a traffic situation comprising:

a first oscillator for transmitting a first unmodulated carrier signal and for setting up a first disturbance field, the first unmodulated carrier signal having a first carrier signal frequency;

a second oscillator for transmitting a second unmodulated carrier signal and setting up a second disturbance field, the second unmodulated carrier signal having a second carrier signal frequency, wherein the frequency locations of the first and second unmodulated carrier signals specify the message regarding the traffic situation;

a first reflected signal receiver associated with the first oscillator for receiving a first reflected signal when a target is within the first disturbance field;

a second reflected signal receiver associated with the second oscillator for receiving a second reflected signal when a target is within the second disturbance field;

a first detector circuit for detecting the presence or absence of a moving target in the first disturbance field;

a second detector circuit for detecting the presence or absence of a moving target in the second disturbance field; and, an indicator for indicating the detected presence of a moving target in either the first or second disturbance field.

10. The device of claim 9 wherein the indicator includes an audible sound.

11. The device of claim 10 wherein the audible sound is a voice-synthesized message.

12. The device of claim 9 wherein the indicator includes a visible display.

13. The device of claim 9 wherein a pair of patch antennas are connected to the first oscillator to transmit the first unmodulated carrier signal.

14. The device of claim 9 wherein a pair of patch antennas are connected to the second oscillator to transmit the second unmodulated carrier signal.

15. The device of claim 9 wherein a first receiver antenna is connected to the first reflected signal receiver to receive the first reflected signal when a target is in the first disturbance field, the first receiver antenna being a patch antenna.

16. The device of claim 9 wherein a second receiver antenna is connected to the second reflected signal receiver to receive the second reflected signal when a target is in the second disturbance field, the second receiver antenna being a patch antenna.

* * * * *